United States Patent [19]

Faure

[11] Patent Number: 5,540,754
[45] Date of Patent: Jul. 30, 1996

[54] METHOD FOR CONDENSATION OF METAL VAPORS TO THE LIQUID STATE

[75] Inventor: Pierre Faure, Annecy, France

[73] Assignee: Pechiney Electrometallurgie, Courbevoie, France

[21] Appl. No.: 358,587

[22] Filed: Dec. 13, 1994

[30] Foreign Application Priority Data

Dec. 15, 1993 [FR] France .................... 93 15514

[51] Int. Cl.$^6$ .................................. C22B 26/22
[52] U.S. Cl. .................. 75/414; 75/10.33; 75/595
[58] Field of Search ................... 75/595, 10.33, 75/414

[56] References Cited

U.S. PATENT DOCUMENTS

| | | | |
|---|---|---|---|
| 2,022,282 | 11/1935 | Hansgirg | 75/595 |
| 2,971,833 | 2/1961 | Artru et al. | |
| 3,775,093 | 11/1973 | Layne | |
| 3,784,371 | 1/1974 | Bangs et al. | |
| 4,478,637 | 10/1984 | Christini et al. | |
| 4,949,781 | 8/1990 | Porowski | 75/595 |

FOREIGN PATENT DOCUMENTS

| | | |
|---|---|---|
| 1052513 | 1/1954 | France . |
| 127435 | 11/1987 | Japan . |

Primary Examiner—Melvyn Andrews
Attorney, Agent, or Firm—Dennison, Meserole, Pollack & Scheiner

[57] ABSTRACT

A method and an apparatus for condensing to the liquid state vapors of a metal having a melting point of between 500° and 850° C. in a double envelope container. The pressures between the two faces of the inner envelope of the container are adjusted to be in equilibrium, and the outer face of the inner envelope is cooled in such a way as to keep the inner face temperature substantially constant in the vicinity of the solidification temperature of the metal. The invention is applicable in particular to condensing magnesium vapors.

8 Claims, 1 Drawing Sheet

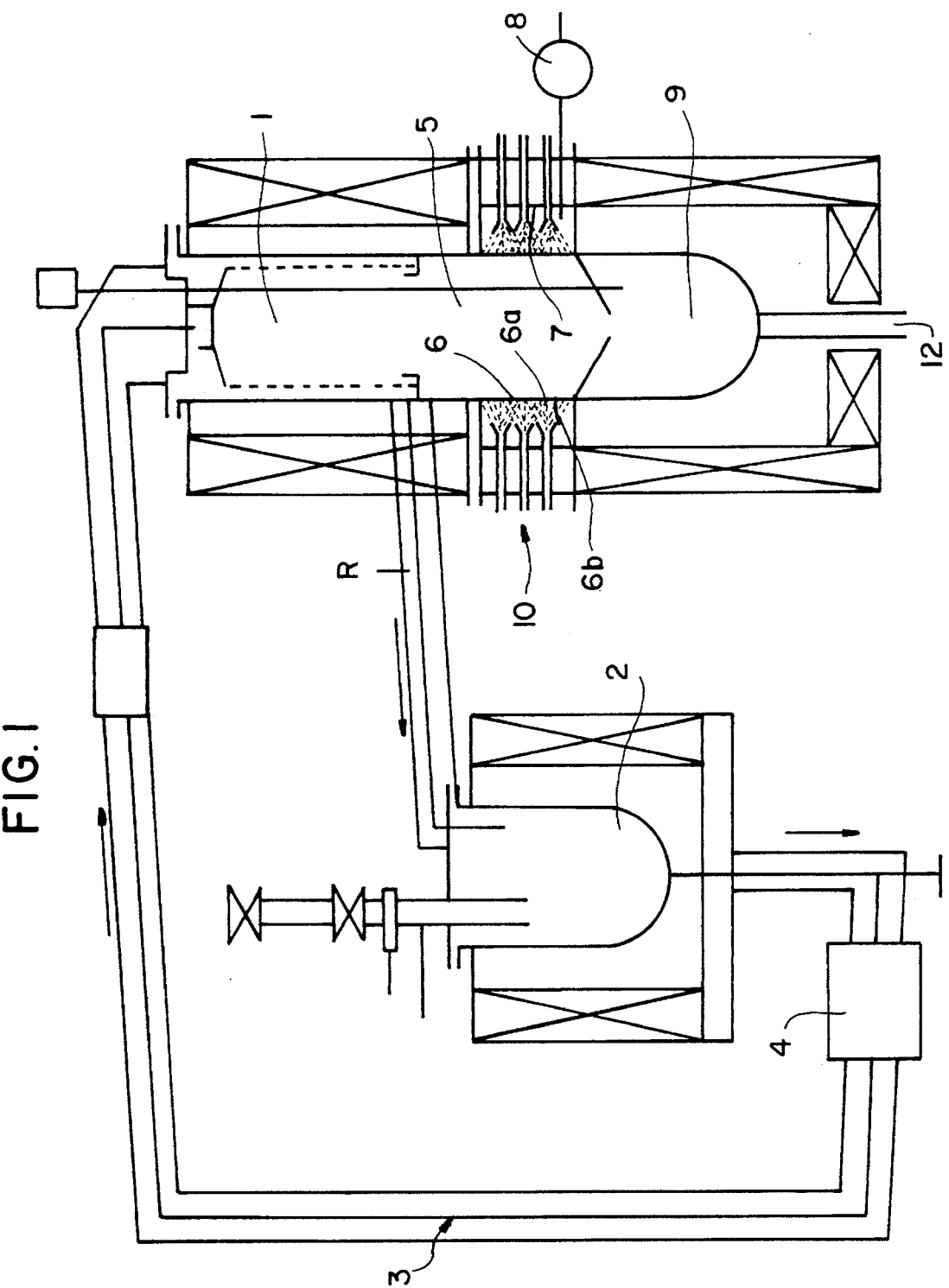

METHOD FOR CONDENSATION OF METAL VAPORS TO THE LIQUID STATE

FIELD OF THE INVENTION

The invention relates to a method and apparatus for condensation of metal vapors to the liquid state, in particular for metals whose melting point is between 500° and 850° C.

DESCRIPTION OF RELATED ART

Metals are in general not very meltable and even less volatile. Nevertheless, if a thermal processing method is available that produces a metal in the form of vapor, then to recover the metal produced, the vapor must be condensed, most often at low pressure. This is the case, for example, when magnesium is produced by electric furnace reduction of dolomite by ferrosilicon, known as the MAGNETHERM PROCESS, and described in French Patent 1194556, corresponding to U.S. Pat. No. 2,971,833.

The condensation is easy to achieve on a cold wall, but the result obtained is generally a porous solid metal, and sometimes one that is even pyrophoric, and which must be remelted to obtain a usable material. Hence the attempt has been made to obtain the metal directly in the liquid state.

It is known to obtain metals in the liquid state for relatively easily melted metals whose melting point is less than 500° C., such as mercury, sodium and zinc, on the condition that vapor pressure of the liquid at the melting point is low and that it is possible to find a material for the condensation wall that is chemically inert to the metal that is to be recovered.

For metals with a higher melting point, it is more difficult to assure good control of the heat exchange that is indispensable to maintaining an adequate temperature.

Condensation assumes in effect a transfer of mass between the vapor and the condensation wall, which transfer is proportional to the difference $P-P_0$ between the pressure of the vapor to be condensed and the vapor tension of the condensate deposited on the wall, and a transfer of heat between the wall and the external environment. Condensation to the liquid state cannot be obtained unless the thermal equilibrium of the wall is assured within a temperature range that is between the melting point and the condensation point of the metal to be condensed.

For maintaining this thermal equilibrium of the condensation wall, French Patent 1052513 (Soberma) and its certificate of addition No. 63774 propose a double envelope cylindrical condenser, having a variable-power electrical resistor located in its axis, that is connected to a pyrometer incorporated in the wall, which makes it possible to keep this wall at the temperature desired. The space between the two envelopes can be filled with a partially conducting material, such as iron filings, or by air without communication with the exterior.

Such a solution can be conceived only in a laboratory installation, and is not applicable to the industrial scale, where the thermal fluxes to be dissipated are considerable. Moreover, to the knowledge of the applicant, no solution industrially applied for condensing to the liquid state metals whose melting point is between 500° and 850° C. exists.

SUMMARY OF THE INVENTION

The object of the invention is to permit the condensation of such metal vapors to the liquid state on an industrial scale, using a method and a heat exchange apparatus that assure proper heat transfer without deterioration of the apparatus.

The invention thus provides a method for condensation to the liquid state of vapors of a metal whose melting point is between 500° and 850° C. within a double envelope container, characterized in that the pressures between the two faces of the inner envelope are made to be in equilibrium, and that the outer face of this inner envelope is cooled in such a way as to keep the outer face temperature substantially constant in the vicinity of the temperature of solidification of the metal, and preferably at the solidification temperature ±50° C.

Preferably, the cooling of the outer face of the inner envelope is accomplished by atomizing water.

The invention also relates to an apparatus for condensation of metal vapors to the liquid state, including:

a supply of metal vapor, a double envelope condenser, a means for suction and/or modification of the pressure of the space defined by the two envelopes, a means for cooling the outer face of the inner envelope of the condenser, a receptacle intended to collect the liquid metal, and a means for evacuating the liquid metal.

DETAILED DESCRIPTION OF THE INVENTION

The inner envelope of the condenser of the invention serves as a condensation surface and withstands a pronounced thermal gradient. The mechanical forces on this envelope, whose strength is low because of its elevated temperature, can be very much reduced by means of an approximate equilibrium of the pressures between the two faces of the envelope.

The outer face of the inner envelope is cooled, preferably by atomizing water through spray nozzles whose output is regulated so as to keep the temperature of the inner face that serves as a condensation wall constant. Heat dissipation is accomplished by the change in phase of the water, which passes from the liquid state to the gaseous state. This enables easy control of the thermal flux dissipated, which can attain values on the order of 100 kW/m². These thermal fluxes are much greater than those which can be dissipated by radiation and forced gas convection, but markedly less than those that would result from direct cooling by circulation of water or some other heat transfer liquid, but which would cause a lowering in the temperature of the wall and bring about solidification of the metal on it.

The free space between the two envelopes is then filled with water vapor and the condensates are evacuated, either by exposure to air or by pumping, for example using a liquid ring pump. If necessary, a pressure lower than atmospheric pressure is maintained in this zone, which makes it possible, when the metal vapor is produced at reduced pressure, to create an equilibrium between the pressures on the two faces of the inner envelope.

Inside the condenser, a trickling film forms on the condensation wall and is recovered at the bottom of the apparatus. To lessen the risk of corrosion of the wall by the liquid metal, the temperature of the condensation wall can be lowered to slightly below the solidification temperature, for example by less than 50° C.; since this temperature is near the solidification temperature of the metal, a thin film of solid condensate can be formed on the wall, which protects the wall from contact with the liquid metal, which will be subsequently deposited thereon.

To protect the condensation wall even better, and to obtain temperatures that are not as elevated for the metal of the inner envelope, the inner face of this envelope may be covered with a protective nonmetal lining which is a relatively poor thermal insulator, such as a graphite sheath or graphite brickwork, whose thickness is calculated so as to obtain a significant temperature drop of at most 400° C. between the condensation surface and the metal part of the envelope; this makes it possible to prevent plastic flow of this metal part.

To assure a good flow of the liquid metal along the wall, its output can be increased by partial recycling, for instance by means of an electromagnetic pump or by means of a column of liquid metal set in motion by injection of gas that is inert to the metal, such as argon.

One benefit from this liquid metal recycling loop is to assure supplementary cooling, for example with the aid of pins cooled by a heat transfer liquid.

The inner envelope must be made of a material that is as inert as possible with respect to the metal to be condensed. Protective surface treatments or claddings of a different metal are also contemplated. The same is true for the outer face of the inner envelope that is in contact with the water vapor, for which it may be advantageous to use sheet steel clad with stainless steel.

One of the advantages of the method of the invention is that the condensation can be achieved in the absence of air, over a wide range of pressures, ranging from a vacuum of less than 0.1 torr to pressures slightly higher than atmospheric pressure. In fact, adjusting the pressure between the two envelopes makes it possible neutralize the mechanical forces on the condensation wall, which otherwise, because of its temperature, could not withstand these stresses without flowing.

BRIEF DESCRIPTION OF THE DRAWING

FIG. 1 is a schematic cross-sectional representation of an apparatus according to the invention.

EXAMPLE

An experimental apparatus for condensing magnesium vapors to the liquid state as shown in FIG. 1. The apparatus includes a trickling film evaporator 1, supplied with liquid magnesium from a melting kettle 2 connected to the evaporator by a liquid magnesium circuit 3 placed under pressure by an electromagnetic pump 4. Magnesium flows in the direction of the arrows, and is recycled to the kettle 1 in leg R of the circuit.

Connected to evaporator 1 is a condenser 5 according to the invention, including a cylindrical inner envelope 6 formed of soft steel with an inner diameter of 258 mm, a height of 260 mm and a thickness of 40 mm. The inner envelope 6 includes an inner face 6a and an outer face 6b, and is surrounded by an outer envelope 7. The outer face 6b of the inner envelope 6 is cooled by spray nozzles 10, three sets of which are supplied in the space 11 between the outer and inner envelopes. The output of atomized water is 27 l/h.

The pressure in space 11 between the inner and outer envelopes is equilibrated with the pressure within the inner envelope by means of pump 8. Pump 8 also removes water vapor from the space between the inner and outer envelopes.

Below the condenser 5, there is a receptacle 9 for collection and storage of the condensed liquid magnesium. The liquid magnesium may be removed from receptacle 9 through an outlet 12.

The use of this device has demonstrated satisfactory operation of the condenser with a production rate of 12.7 kg/h of magnesium, or 60 kg/m$^2$/h. The evaporator had a temperature of 820° C. with a vapor pressure of 40 torr, and the condensation wall was held at 660° with a vapor tension of 3 torr. An intentional addition of 100 ppm of nickel to the magnesium in the evaporation loop made it possible to assure that no spillover whatever could occur in the liquid condensate. Dismantling the apparatus at the end of operation made it possible to verify that the thickness of the solid magnesium deposit on the condensation wall was less than 0.5 mm.

What is claimed is:

1. A method for condensing, under lower than atmospheric pressure, vapors of a metal having a melting point between 500° and 850° C. directly to a liquid state, comprising the steps of:

a) providing a double envelope container including an inner envelope having an inner face on which the vapors condense and an outer face, and an outer envelope surrounding the inner envelope opposite the outer face and defining therebetween a space;

b) supplying the metal vapor at lower than atmospheric pressure from a source thereof to the inner face of the inner envelope;

c) equilibrating the pressure on the outer face of the inner envelope with the lower than atmospheric pressure on the inner face;

d) cooling the outer face of the inner envelope so as to maintain a temperature on the outer face which is substantially constant and approximately the solidification temperature of the metal vapor; and e) removing the metal in liquid form from the inner face of the inner envelope.

2. The method of claim 1, wherein said outer face is maintained at said solidification temperature ±50° C.

3. The method of claim 1, wherein the outer face of the inner envelope is cooled by spraying water on the outer face.

4. The method of claim 1, wherein the inner wall of the inner envelope is maintained at a temperature that is below the solidification temperature of the metal by at most 50° C.

5. The method of claim 1, additionally comprising insulating in the inner face by covering with a nonmetal liner that is a poor thermal insulator.

6. The method of claim 1, additionally comprising insulating the inner face by covering with graphite.

7. The method of claim 1, additionally comprising evaporating liquid metal to metal vapor for said supply, and recycling a portion of said liquid metal to a source thereof.

8. The method of claim 1, wherein the metal is magnesium.

* * * * *